(12) United States Patent
Cricri

(10) Patent No.: US 10,242,289 B2
(45) Date of Patent: Mar. 26, 2019

(54) METHOD FOR ANALYSING MEDIA CONTENT

(71) Applicant: Nokia Technologies Oy, Espoo (FI)

(72) Inventor: Francesco Cricri, Tampere (FI)

(73) Assignee: Nokia Technologies Oy, Espoo (FI)

( * ) Notice: Subject to any disclaimer, the term of this patent is extended or adjusted under 35 U.S.C. 154(b) by 279 days.

(21) Appl. No.: 15/374,010

(22) Filed: Dec. 9, 2016

(65) Prior Publication Data

US 2017/0177972 A1 Jun. 22, 2017

(30) Foreign Application Priority Data

Dec. 21, 2015 (GB) .................................. 1522482.7

(51) Int. Cl.
*G06K 9/46* (2006.01)
*G06K 9/62* (2006.01)

(52) U.S. Cl.
CPC ......... *G06K 9/4671* (2013.01); *G06K 9/4628* (2013.01); *G06K 9/6217* (2013.01)

(58) Field of Classification Search
None
See application file for complete search history.

(56) References Cited

U.S. PATENT DOCUMENTS

| 2011/0058747 | A1* | 3/2011 | Nakagomi | ............... | G06K 9/46 382/195 |
| 2013/0158963 | A1* | 6/2013 | Brooks | ................ | G06K 9/4623 703/2 |
| 2013/0230253 | A1* | 9/2013 | Stankiewicz | ........ | G06K 9/4671 382/195 |
| 2013/0259448 | A1* | 10/2013 | Stankiewicz | ........ | G06K 9/4628 386/278 |
| 2014/0037215 | A1 | 2/2014 | Kumar et al. | | |

FOREIGN PATENT DOCUMENTS

| CN | 103065136 A | 4/2013 |
| CN | 104346607 A | 2/2015 |
| CN | 104657748 A | 5/2015 |

OTHER PUBLICATIONS

Cho, K.—"Describing Multimedia Content using Attention-based Encoder-Decoder Networks"—arXiv Jul. 2015, pp. 1-12 (Year: 2015).*

(Continued)

*Primary Examiner* — Bernard Krasnic

(74) *Attorney, Agent, or Firm* — Nokia Technologies Oy

(57) ABSTRACT

A method for operating a computer graphic system, the method comprising: inputting a media content object (MCO) into a feature extractor comprising semantic abstraction levels; extracting feature maps from the MCO on each of the semantic layers; selecting at least a portion of the MCO to be analyzed; determining, based on the analysis of the feature maps from the portion of the MCO and the analysis of a previous state of a recognition unit, one or more feature maps selected from the feature maps of the semantic layers; determining a weight for each feature map; repeating the determining steps N times, each time processing, based on the analysis, each feature map by applying the corresponding weight; inputting the processed feature maps to the recognition unit; and analyzing a number of the processed feature maps until a prediction about the portion of the MCO is output.

21 Claims, 4 Drawing Sheets

(56) References Cited

OTHER PUBLICATIONS

Pan, P.—"Hierarchical Recurrent Neural Encoder for Video Representation with Application to Captioning"—arXiv Nov. 2015, pp. 1-10 (Year: 2015).*
Xu et al., "Show, Attend and Tell: Neural Image Caption Generation With Visual Attention", Proceedings of the 32nd International Conference on Machine Learning, vol. 37, 2015, 10 pages.
Girshick et al., "Rich Feature Hierarchies for Accurate Object Detection and Semantic Segmentation", IEEE Conference on Computer Vision and Pattern Recognition, Jun. 23-28, 2014, pp. 580-587.
Ranzato, "On Learning Where to Look", IEEE Conference on Computer Vision and Pattern Recognition, Apr. 24, 2014, pp. 1-14.
Search Report received for corresponding United Kingdom Patent Application No. 1522482.7, dated May 17, 2016, 4 pages.
Vinyals et al., "Show and Tell: A Neural Image Caption Generator", Computer Vision and Pattern Recognition, Jun. 7-12, 2015, pp. 3156-3164.
Iwasaki et al., "A Proposal of a New Feature Generation Method and Its Application to Associative Memories Based on Attention", IEEJ Transactions on Electronics, Information and Systems, vol. 119, No. 12, Dec. 19, 2008, pp. 1461-1467. (Abstract only).

* cited by examiner

METHOD FOR ANALYSING MEDIA CONTENT

CROSS-REFERENCE TO RELATED APPLICATION

This application claims priority from United Kingdom application No. 1522482.7, filed Dec. 21, 2015.

FIELD OF THE INVENTION

The present invention relates to computer vision and machine learning, and more particularly to a method for analysing media content.

BACKGROUND OF THE INVENTION

Many practical applications rely on the availability of semantic information about the content of media, such as images, videos, etc. Semantic information is represented by metadata which may express the type of scene, the occurrence of a specific action/activity, the presence of a specific object, etc. Such semantic information can be obtained by analysing the media.

The analysis of media is a fundamental problem which has not yet been completely solved. This is especially true when considering the extraction of high-level semantics, such as object detection and recognition, scene classification (e.g., sport type classification), action/activity recognition, etc.

Recently, the development of various neural network techniques has enabled learning to recognize image content directly from the raw image data, whereas previous techniques consisted of learning to recognize image content by comparing the content against manually trained image features. Very recently, neural networks have been adapted to take advantage of visual spatial attention, i.e. the manner how humans conceive a new environment by focusing first to a limited spatial region of the scene for a short moment and then repeating this for a few more spatial regions in the scene in order to obtain an understanding of the semantics in the scene.

However, while providing good recognition accuracy, the semantic understanding of the image content in the known systems is rather limited. Also the computational complexity of these systems, despite of significant improvements recently, is still rather high.

SUMMARY OF THE INVENTION

Now there has been invented an improved method and technical equipment implementing the method, by which the above problems are at least alleviated. Various aspects of the invention include a method, an apparatus and a computer program, which are characterized by what is stated in the independent claims. Various embodiments of the invention are disclosed in the dependent claims.

According to a first aspect, there is provided a method for operating a computer graphic system, the computer graphic system comprising a processor, a memory and an input/output (I/O) circuit, the method comprising: inputting a media content object via the I/O circuit into a feature extractor comprising a plurality of semantic layers forming a hierarchy of increasing semantic abstraction levels; extracting, by the feature extractor, a plurality of feature maps from said media content object on each of said plurality of semantic layers; selecting at least a portion of the media content object to be analysed; determining, by a feature attention modelling unit, based on the analysis of said plurality of feature maps extracted on each of said plurality of semantic layers from at least the portion of the media content object and the analysis of a previous state of a recognition unit, one or more feature maps selected from said plurality of feature maps of said plurality of semantic layers; determining a weight for each of said one or more feature maps; repeating the determining steps N times, N being a positive integer, each time processing, based on the analysis of said plurality of the feature maps and of the previous state of the recognition unit, each of said one or more feature maps by applying the corresponding weight; inputting said processed feature maps in an order corresponding to processing said feature maps to the recognition unit; and analysing a number of said processed features maps in said order in the recognition unit until a prediction about at least said portion of the media content object is output.

According to an embodiment, the method further comprises selecting a next portion of the media content object to be analysed.

According to an embodiment, the order of processing the feature maps for said portion of the media content object is a predetermined order based on the analysis of the feature maps extracted from the portion of the media content object and of the previous state of the recognition unit.

According to an embodiment, the feature extractor is a convolutional neural network (CNN) and the recognition unit is implemented as a Recurrent Neural Network (RNN).

According to an embodiment, said one or more feature maps comprises a subset of feature maps selected from said plurality of feature maps of said plurality of semantic layers and a weight equal to 1 is determined for each of said one or more feature maps and a weight equal to 0 for all feature maps not belonging to said subset.

According to an embodiment, a training technique suitable for non-differentiable models, such as Reinforcement Learning, is used for training the feature attention modelling unit.

According to an embodiment, said one or more feature maps comprises all feature maps from said plurality of feature maps of said plurality of semantic layers and a plurality of different weights are determined for each of the feature maps, wherein the sum of the weights is equal to 1.

According to an embodiment, the processing of each of the feature maps extracted on each of said plurality of semantic layers from at least the portion of the media content object further comprises applying each of the determined plurality of different weights on of the corresponding feature map; and combining the weighted feature maps by concatenating or summing.

According to an embodiment, said next feature map processed based on the analysis of said plurality of the feature maps and of the previous state of the recognition unit is a next weighted combination of feature maps.

According to an embodiment, a training technique suitable for differentiable models, such as Stochastic Gradient Descent with backpropagation, is used for training the feature attention modelling unit.

According to a second aspect, there is provided an apparatus comprising at least one processor, an input/output (I/O) circuit, memory including computer program code, the memory and the computer program code configured to, with the at least one processor, cause the apparatus to at least: input a media content object via the I/O circuit into a feature extractor comprising a plurality of semantic layers forming a hierarchy of increasing semantic abstraction levels; extract, by the feature extractor, a plurality of feature maps from said media content object on each of said plurality of semantic layers; select at least a portion of the media content object to be analysed; determine, by a feature attention modelling unit, based on the analysis of said plurality of feature maps extracted on each of said plurality of semantic layers from at least the portion of the media content object and the analysis of a previous state of a recognition unit, one or more feature maps selected from said plurality of feature maps of said plurality of semantic layers; determine a weight for each of said one or more feature maps; repeat the determining steps N times, N being a positive integer, each time processing, based on the analysis of said plurality of the feature maps and of the previous state of the recognition unit, each of said one or more feature maps by applying the corresponding weight; input said processed feature maps in an order corresponding to processing said feature maps to the recognition unit; and analyse a number of said processed features maps in said order in the recognition unit until a prediction about at least said portion of the media content object is output.

According to a third aspect, there is provided a computer program embodied on a non-transitory computer readable medium, the computer program comprising instructions causing, when executed on at least one processor, at least one apparatus to carry out the above method steps.

These and other aspects of the invention and the embodiments related thereto will become apparent in view of the detailed disclosure of the embodiments further below.

LIST OF DRAWINGS

In the following, various embodiments of the invention will be described in more detail with reference to the appended drawings, in which FIG. 1 shows a computer graphics system suitable to be used in a computer vision process according to an embodiment;

DESCRIPTION OF EMBODIMENTS

Figure 1:
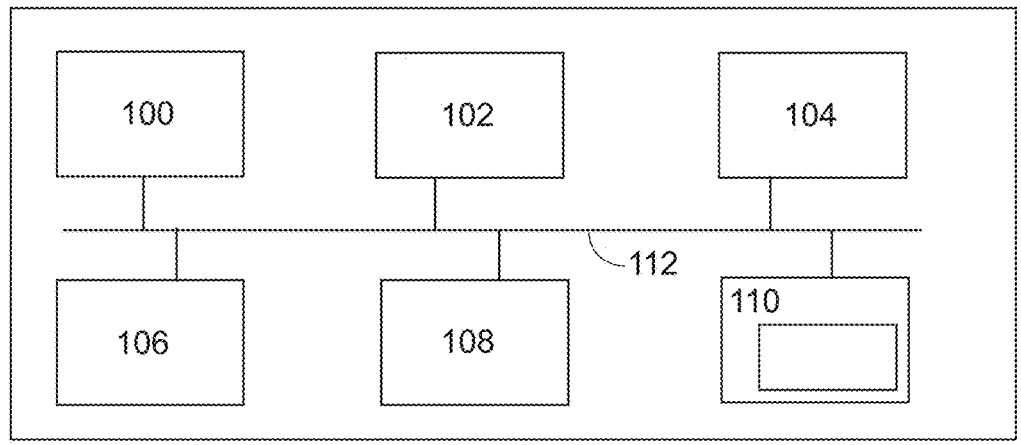

FIG. 1 shows a computer graphics system suitable to be used in image processing, for example in computer vision process according to an embodiment. The generalized structure of the computer graphics system will be explained in accordance with the functional blocks of the system. For a skilled person, it will be obvious that several functionalities can be carried out with a single physical device, e.g. all calculation procedures can be performed in a single processor, if desired. A data processing system of an apparatus according to an example of FIG. 1 includes a main processing unit 100, a memory 102, a storage device 104, an input device 106, an output device 108, and a graphics subsystem 110, which all are connected to each other via a data bus 112.

The main processing unit 100 is a conventional processing unit arranged to process data within the data processing system. The memory 102, the storage device 104, the input device 106, and the output device 108 are conventional components as recognized by those skilled in the art. The memory 102 and storage device 104 store data within the data processing system 100. Computer program code resides in the memory 102 for implementing, for example, computer vision process. The input device 106 inputs data into the system while the output device 108 receives data from the data processing system and forwards the data, for example to a display. The data bus 112 is a conventional data bus and while shown as a single line it may be a combination of a processor bus, a PCI bus, a graphical bus, and an ISA bus. Accordingly, a skilled person readily recognizes that the apparatus may be any conventional data processing device, such as a computer device, a personal computer, a server computer, a mobile phone, a smart phone or an Internet access device, for example Internet tablet computer. The input data of the computer vision process according to an embodiment and means for obtaining the input data are described further below.

It needs to be understood that different embodiments allow different parts to be carried out in different elements. For example, various processes of the computer vision system may be carried out in one or more processing devices; for example, entirely in one computer device, or in one server device or across multiple user devices. The elements of computer vision process may be implemented as a software component residing on one device or distributed across several devices, as mentioned above, for example so that the devices form a so-called cloud.

The state-of-the-art approach for the analysis of data in general and of visual data in particular is deep learning. Deep learning is a sub-field of machine learning which has emerged in the recent years. Deep learning typically involves learning of multiple layers of nonlinear processing units, either in supervised or in unsupervised manner. These layers form a hierarchy of layers. Each learned layer extracts feature representations from the input data, where features from lower layers represent low-level semantics, and features from higher layers represent high-level semantics (i.e. more abstract concepts). Unsupervised learning applications typically include pattern analysis and supervised learning applications typically include classification of image objects.

Recent developments in deep learning techniques allow for recognizing and detecting objects in images or videos with great accuracy, outperforming previous methods. The fundamental difference of deep learning image recognition techniques compared to previous methods is learning to recognize image objects directly from the raw data, whereas previous techniques are based on recognizing the image objects from hand-engineered features (e.g., SIFT features). During the training stage, deep learning techniques build hierarchical layers which extract features of increasingly abstract level.

Thus, an extractor or a feature extractor is commonly used in deep learning techniques. A typical example of a feature extractor in deep learning techniques is the Convolutional Neural Network (CNN), shown in FIG. 2. A CNN is composed of one or more convolutional layers with fully connected layers on top. CNNs are easier to train than other deep neural networks and have fewer parameters to estimate. Therefore, CNNs have turned out to be a highly attractive architecture to use, especially in image and speech applications.

Figure 2:
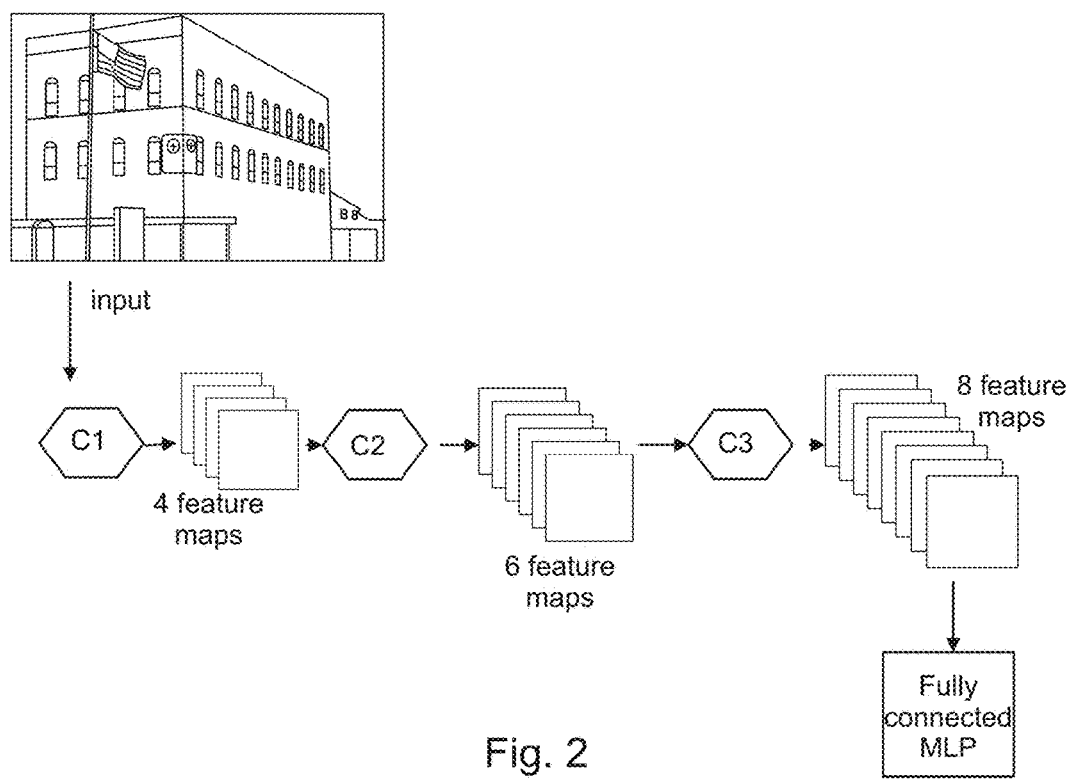
FIG. 2 shows an example of a Convolutional Neural Network typically used in computer vision systems.

In FIG. 2, the input to a CNN is an image, but any other media content object, such as a video file, could be used as well. Each layer of a CNN represents a certain abstraction (or semantic) level, and it extracts multiple feature maps.

The CNN in FIG. 2 has only three feature (or abstraction, or semantic) layers C1, C2, C3 for the sake of simplicity, but current top-performing CNNs may have over 20 feature layers.

The first convolution layer C1 of the CNN consists of extracting 4 feature-maps from the first layer (i.e. from the input image). These maps may represent low-level features found in the input image, such as edges and corners. The second convolution layer C2 of the CNN, consisting of extracting 6 feature-maps from the previous layer, increases the semantic level of extracted features. Similarly, the third convolution layer C3 may represent more abstract concepts found in images, such as combinations of edges and corners, shapes, etc. The last layer of the CNN (fully connected MLP) does not extract feature-maps. Instead, it usually consists of using the feature-maps from the last feature layer in order to predict (recognize) the object class. For example, it may predict that the object in the image is a house.

In order to clarify the discussion below, the term "hard sequential attention" (also referred to as "stochastic sequential attention") or just "hard attention" (also referred to as "stochastic attention") is defined to refer to a sequential process made of N time-steps, wherein N=1, 2, 3, . . . . At each time-step, the process (performed by a human or by a computer) focuses/concentrates on a limited portion of the whole available information. When moving to the next time-step, the focus changes to a different limited portion of the whole available information. After N time-steps, the process has focused on N different limited portions of the whole available information.

In contrast, the term "soft sequential attention" (also referred to as "deterministic sequential attention") or just "soft attention" (also referred to as "deterministic attention") is still a sequential process made of N time-steps but differs from the hard attention in the produced output. At each time-step, the process (performed by a human or by a computer) focuses/concentrates more on one or more limited portions of the whole available information, and less on all other portions. When moving to the next time-step, the focus changes such that it is more on one or more different limited portions of the whole available information, and less on all other portions. After N time-steps, the process has focused more on N different limited portions of the whole available information.

Very recently, several researchers have shown that giving an entire input image to a neural network is not the most efficient or effective way to understand it. Instead, it is proposed to exploit spatial attention, as we humans do. In fact, when we watch a new environment (e.g., a room), we do not analyze the entire scene that our eyes can capture all at once. Instead, we perform a sequential process, i.e., we concentrate on a relatively limited region (a glimpse) of the whole area at each time instant, and we repeat this several times (e.g., look at 3 different parts of the area during 3 subsequent time-steps). By changing the glimpse location to different parts of the scene, we build an internal representation and understanding of the scene/environment.

It is possible to use deep learning for computerized simulation of the spatial attention process, in order to better understand visual content, for example, for recognizing objects or for describing an image using natural language. One example prior art is given in Kelvin Xu, Jimmy Ba, Ryan Kiros, Kyunghyun Cho, Aaron Courville, Ruslan Salakhutdinov, Richard Zemel, Yoshua Bengio, "Show, attend and tell: neural image caption generation with visual attention", Cornell University library, 10 Feb. 2015, where the authors use spatial attention for describing images using natural language.

In the system of Xu et al., an image is given to a CNN in order to extract features from the last feature layer. The feature map describing the whole image is then given to the visual attention model which is trained to attend to, i.e. focus on, different spatial regions (glimpses) of the feature map. At each glimpse, a Recurrent Neural Network (RNN) tries to predict a word in order to produce a final caption sentence describing the content of the image Thus, the highest-abstraction level of the CNN is used for recognising the spatial location at different time steps.

Herein, the usage of the spatial attention model enables to achieve lower computational complexity, because only limited portions of the image are analysed, and higher accuracy and interpretability of the recognition results, because only the most relevant spatial locations of the image are analysed.

However, even though the above arrangement provides a rather fast and reliable recognition procedure, it nevertheless involves some complexity, since at each step it can focus only on the feature-maps from the highest abstraction level, and thus it may require many steps. Moreover, the approach is semantically rather limited since only the highest-abstraction level of the CNN is used for recognition. Nonetheless, for a certain spatial location in the image, the most useful information might be a lower-level detail, such as an edge, or some texture feature.

Herein below, a novel recognition method and framework are presented, which attend to different levels of abstractions for the same spatial location at different time steps.

Figure 3:
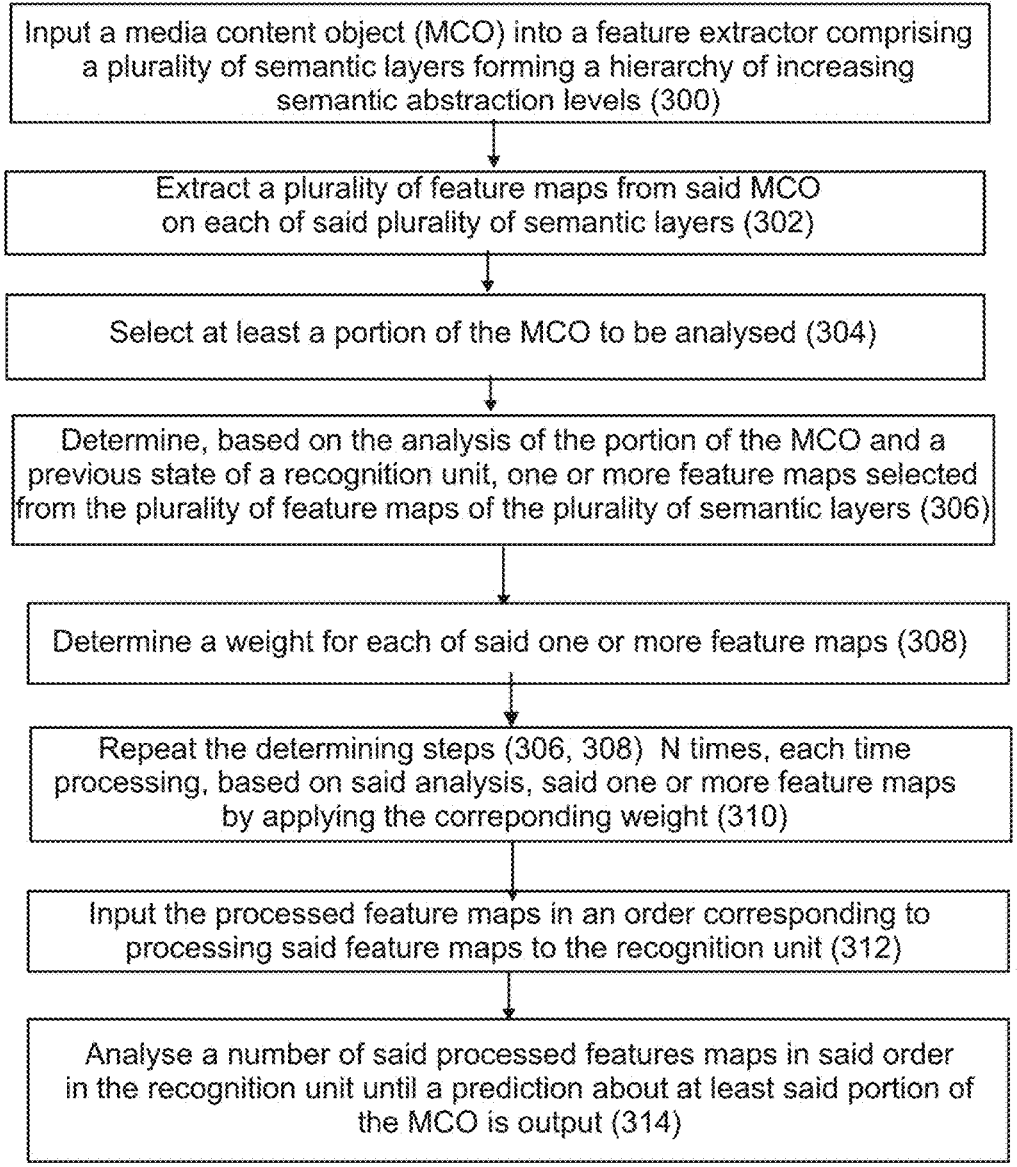
FIG. 3 shows a flow chart for a computer vision process according to an embodiment of the invention.

The method, which is disclosed in FIG. 3, can be operated in a computer graphic system, the computer graphic system comprising a processor, a memory and an input/output (I/O) circuit. The method disclosed in FIG. 3 is a general illustration of various embodiments, which can be used in a hard attention or stochastic version of the method, as such.

In the method, a media content object is input (300) via the I/O circuit into a feature extractor comprising a plurality of semantic layers forming a hierarchy of increasing semantic abstraction levels. A plurality of feature maps are extracted (302) by the feature extractor from said media content object on each of said plurality of semantic layers. Then at least a portion of the media content object, possibly the whole media content object, is selected (304) to be analysed, and based on the analysis of said plurality of feature maps extracted on each of said plurality of semantic layers from at least the portion of the media content object and the analysis of a previous state of a recognition unit, one or more feature maps are determined (306) by a feature attention modelling unit to be selected from said plurality of feature maps of said plurality of semantic layers. For each of said one or more feature maps, a weight is determined (308). The determining steps are repeated (310) N times, N being a positive integer, each time processing, based on the analysis of said plurality of the feature maps and of the previous state of the recognition unit, each of said one or more feature maps by applying the corresponding weight. The processed feature maps are input (312) in an order corresponding to selecting said feature maps to the recognition unit, and a number of said processed features maps are analysed (314) in said predetermined order in the recognition unit until a prediction about at least said portion of the media content object is output.

In other words, the recognition of media content objects, such as images or videos, is improved by providing the recognition model with semantically enhanced information, i.e., an optimal set of features from any of the semantic layers provided in an optimal sequence, instead of only from the last semantic layer. By applying the weights in different manners, the method can be implemented as a hard attention or a soft attention model, as described more in detail below. The recognition unit outputs a prediction, whose nature depends on the particular task. In case of image classification task, the recognition unit analyses the input sequence until a class of at least one feature within said portion of the image is recognised or predicted. In case of image captioning task, the recognition unit analyses the input sequence and will output a word at each time step or after few time steps, in order to create a sentence describing the content of the (portion of the) image.

According to an embodiment, the method further comprises selecting a next portion of the image to be analysed. Thus, if it is necessary to recognise content outside the first portion of the image, a next portion of the image is selected and analysed as described above.

Accordingly, the operation of a computer vision system is brought closer to how we humans analyse a certain visual scene; we perform a sequential process (a sequence of steps) in order to understand the scene. First of all, we perform spatial attention. I.e., at each time instant, we focus on a different spatial region in order to analyse a different object or a part of an object, and we repeat this operation for a few time-steps. However, we not only look at different parts of the scene, but we also focus on several types of information (specific characteristics, or features) for each part (location) of the scene. We do this in a sequential process too, i.e., we focus on a different characteristic at each time-instant.

Herein, this is referred to as "feature attention". In other words, feature attention is the sequential process of focusing our attention on different characteristics of a certain part of visual scene, one characteristic at a time.

For example, for a certain part of a scene, we analyse first a certain feature at time T1, then another feature at time T2, and so on until we have understood that part of the scene (by means of feature attention). Then, we move on to another part of the scene (by means of spatial attention) and repeat the feature attention process.

Figure 4:
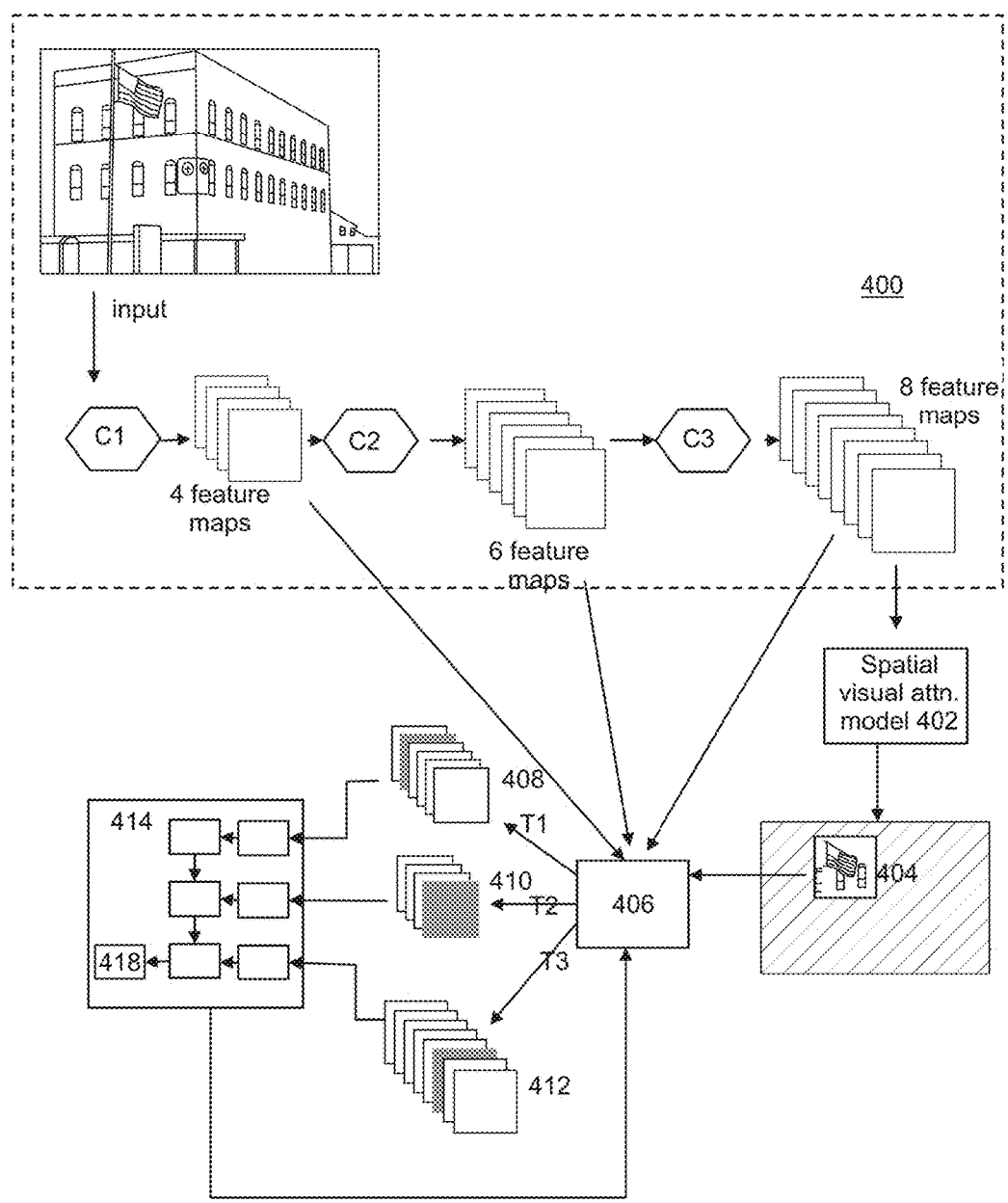
FIG. 4 shows a block chart for a computer vision system according to an embodiment of the invention.

FIG. 4 shows a more detailed illustration of an exemplified framework for implementing the feature attention modelling in a computer vision system as the hard attention or stochastic version.

In FIG. 4, a feature extraction model is implemented similarly as in FIG. 2, i.e. a Convolutional Neural Network (CNN) having three feature (semantic) layers C1, C2, and C3, said layers having 4, 6 and 8 feature maps, correspondingly. It is noted that the implementation of the framework is not limited to CNNs only, but any other hierarchical feature extraction model may be used, such as Multi-Layer Perceptron networks, Deep Boltzmann Machines, Auto-Encoders, etc. In FIG. 4, the CNN is used for extracting feature maps from all semantic layers in the feature hierarchy of the CNN.

The whole CNN feature extraction modelling unit 400 may be regarded as a pre-processing phase, which is performed only once for each input image. The input to the CNN is an image, and the output is a set of feature maps from different semantic layers of the CNN. All of these feature maps, or a subset of them, may then be used as the input to a feature attention modelling stage, in contrast to known methods which use only the feature maps from the last semantic layer.

In a spatial visual attention modelling unit 402, a spatial location of the image, in other words a portion of the image 404, is selected to be analysed. For example, a context vector, capturing the visual information associated with a particular input location, can be used for determining which portion of the image is selected, as explained in the document by Xu et al. Herein, the portion of the image may also refer to the whole image. The analysis is carried out in a feature attention modelling unit 406.

Herein, it is assumed that the feature attention model has previously been trained to perform a sequential process, where at each time-step of the process the feature attention model may attend to feature maps on a different semantic level. More details on the training are given further below.

If spatial attention modelling is used, the spatial location obtained at time T1 is used in order to consider the portions of feature maps corresponding to the attended spatial location. I.e., the feature maps will be cropped. The feature attention model analyses the cropped feature maps (or the original feature maps if no spatial attention is used) and the previous state (current time step minus one) of the recognition unit (e.g., the previous hidden state of a Recurrent Neural Network), in order to select the sequence of feature maps to be analysed at each time step. In particular, in the hard attention case, one or more feature maps are selected at a time.

In case of hard attention version, said one or more feature maps selected for processing comprise a subset of feature maps selected from said plurality of feature maps of said plurality of semantic layers and a weight equal to 1 is determined for each of said one or more feature maps and a weight equal to 0 for all remaining (i.e. non-selected) feature maps.

Thus, only a subset of feature maps (one or more but not all) is used in the process such that they are left unchanged (i.e., unweighted) by applying a weight equal to 1 for each feature map. The processed feature maps may then be combined by sum, average, or concatenation.

According to an embodiment, the order of processing the feature maps for said portion of the image is a predetermined order based on the analysis of the portion of the image.

For example, for a certain spatial location (an image portion), the best feature level might not be the features of the highest semantic level, which usually represent only high-level concepts such as "sunset", "soccer", "landscape". Instead, it is beneficial to have a predetermined sequence of steps (a policy) that tells which feature levels to be used and in which order, depending on the input image, or a portion thereof.

For example, as shown in FIG. 4, for a certain (portion of an) image, the optimal policy may be to analyse feature maps in the following order:

Time-step 1: second feature map from layer C2 to check if there is a middle-level concept associated with the (portion of the) image (408);

Time-step 2: fourth feature map from layer C1 (edges, corners) to obtain a low-level understanding of the content (410);

Time-step 3: sixth feature map from layer C3 to confirm from the highest layer what was understood up to now (412).

The policies or rules for selecting the optimal semantic levels in the optimal order are determined via training, i.e., by learning them from annotated data via supervised training (for example, by Stochastic Gradient Descent in the case of soft feature attention modeling).

As a result, the feature attention modelling unit 406 outputs one feature map, possibly combined from a plurality of feature maps, for each time-step. The output of the feature attention modelling unit is the input to the recognition modelling unit 414.

According to an embodiment, the recognition modelling unit is implemented as a Recurrent Neural Network (RNN), which is able of modelling temporal aspects of data.

At each time-step, the RNN would receive the feature map according to the predetermined order from the feature attention model, wherein the feature map may be from any of the semantic layers of the CNN. After N time-steps, the RNN has received N feature maps. This way, the RNN can focus on different abstraction levels at different times, and not only on the highest-level features. The recognition unit 414 analyses a sufficient number of portions of the media content object. After each analysis step, the internal state of the recognition unit 414 at time step $T_n$ is given as feedback 416 to the feature attention modelling unit 406 to be used for the next time step $T_{n+1}$ analysis. Finally, the recognition unit 414 outputs a prediction 418, which is dependent on the recognition particular task.

In case the task is image classification, when the RNN is confident enough, it will output the recognized (or predicted) class of at least one feature associated with the portion of the image. In case of image captioning task, the recognition unit analyses the input sequence and will output a word at each time step or after few time steps, in order to create a sentence describing the content of the (portion of the) image.

This way, the RNN builds an internal representation (understanding) of the image portion by attending to different semantic layers, as we humans do.

The embodiments described in FIG. 4 depict the hard attention or stochastic version of the feature attention model in a computer vision system. However, the feature attention model of FIG. 4 is applicable as a soft attention or deterministic version by making minor amendments in the implementation.

In case of soft attention version, said one or more feature maps selected for processing all feature maps from said plurality of feature maps of said plurality of semantic layers and a plurality of different weights are determined for each of the feature maps, wherein the sum of the weights is equal to 1.

Herein, the processed feature maps comprise all feature maps multiplied by the determined weights, wherein the weights can be normalised such that their sum is equal to one.

According to an embodiment, the processing of each of the feature maps extracted on each of said plurality of semantic layers from at least the portion of the media content object further comprises applying each of the determined plurality of different weights on the corresponding feature map; and combining the weighted feature maps by concatenating or summing.

Thus, in the soft attention or deterministic version, instead of determining only one feature map to be selected, at each time-step the feature attention model unit outputs all the feature maps from all layers, however, each feature map being weighted according to its importance or relevance to the attention. The weights may be referred to as attention weights. Given that L is the number of all feature maps, at each time-step the attention model outputs L attention weights. Each attention weight represents how important the associated feature map is at the current time step. After weighting the feature maps by the attention weights, the resulting weighted feature maps can be combined together.

Herein, two alternative techniques may be used. In the first one, the weighted feature maps are concatenated, thus the final length is equal to the sum of the lengths of the individual feature maps. In the other alternative technique, the weighted feature maps are first converted to be all of the same size (e.g., by down-sampling, by up-sampling, or by using projection matrices, or by any other suitable means), and then summed up.

Then, at each time-step, the weighted and combined (either concatenated or summed) feature maps represent the input to the recognition unit. The soft attention version allows the system to consider all the feature maps at each time-step such that some feature maps have more importance than others. In other words, the system focuses more on some feature maps and less on others, whereas in the hard version the system, at each time-step, highest importance is given to one feature map and no importance to all the other feature maps.

According to an embodiment, said next feature map selected based on the analysis of said plurality of the feature maps and of the previous state of the recognition unit is a next weighted combination of feature maps.

Figure 5:
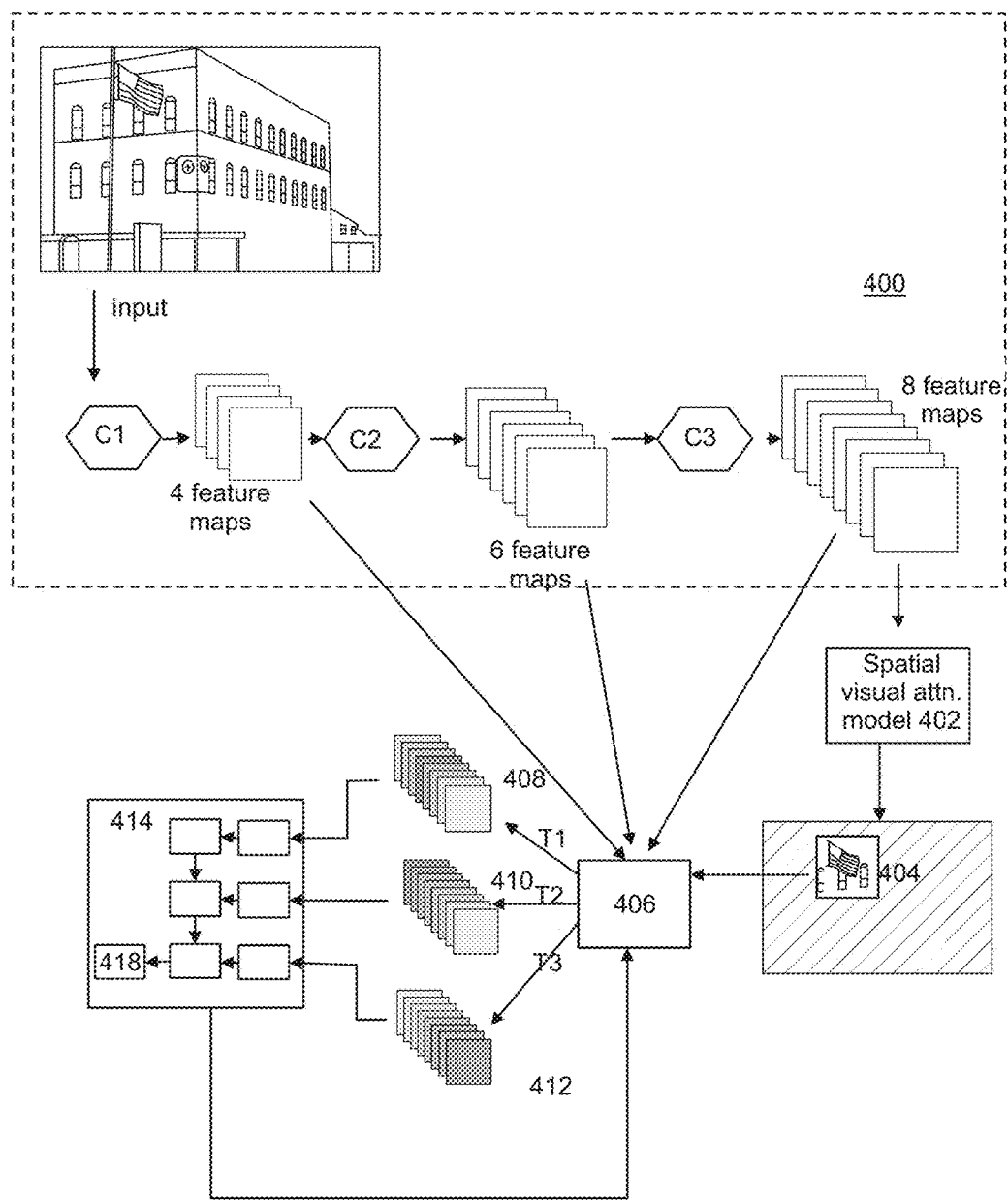
FIG. 5 shows a block chart for a computer vision system according to another embodiment of the invention.

The soft feature attention modelling is illustrated in detail in FIG. 5. Compared to the hard attention model disclosed in FIG. 4, the feature extraction modelling unit 400 the spatial visual attention modelling unit 402, and the selection of at least a portion of the image 404, to be analysed may operate similarly to FIG. 4.

However, the analysis carried out in the feature attention modelling unit 406 differs from the hard attention model. instead of determining only one feature map to be selected, at each time-step The feature attention model unit 406 analyses, at each time step, all the feature maps from all layers and determines the attention weight for each feature map according to its importance or relevance to the attention. The feature attention modelling unit 406 then outputs all the feature maps from all layers, however, as weighted according to their attention weights.

In the example shown in FIG. 5, the feature maps 408 output at the time step T1 are weighted such that middle-level feature maps have more importance (shown as shaded). Correspondingly, the feature maps 410 output at the time step T2 are weighted such that low-level feature maps have more importance, and the feature maps 412 output at the time step T3 are weighted such that high-level feature maps have more importance.

The feature maps are weighted by their corresponding attention weights, and the weighted feature maps are combined together either by concatenating or summing. The combined feature maps are input to the recognition unit 414. Similarly to hard attention version of FIG. 4, the recognition unit 414 analyses a sufficient number of portions of the media content object. After each analysis step, the internal state of the recognition unit 414 at time step $T_n$ is given as feedback 416 to the feature attention modelling unit 406 to be used for the next time step $T_{n+1}$ analysis. Finally, the recognition unit 414 outputs a prediction 418, which is dependent on the recognition particular task.

Thus, the embodiments as described herein, both in the hard and in the soft attention model, combine the spatial attention model and the feature attention model. Spatial attention models usually have two advantages. On one hand, they allow for not analysing the whole visual scene but only few limited regions, hence reducing the computational complexity. On the other hand, the analysis results often outperform those from techniques which consider the whole scene, due to avoiding visual clutter which would confuse the recognition and to the possibility of focusing on relevant portions of the image at each time-step.

Feature attention modelling, coupled with spatial attention modelling will still have the computational complexity advantage due to the use of image portions, but it can also analyse data at different feature levels, thus being closer to what humans do. Furthermore, in some cases the feature attention model may require a smaller number of image portions to come up with the prediction, because for each image portion it will attend the most suitable feature levels. This will further lower the computational complexity. Instead, if only spatial attention is used, many image portion might be needed to predict a label, as there is no selection of the optimal feature level for each glimpse.

Consequently, due to the computational advantages, the embodiments as described herein are preferable for analyzing large amounts of content such as the visual content captured by a 360° camera. In fact, the high resolution and spherical field of view make the analysis very challenging, as the amount of data is huge and the content may have very different semantic level in the different angular locations and distances.

According to an embodiment, when the hard attention modelling approach is used, wherein only one semantic layer is attended at each time step, the model is not differentiable. Thus, for training the feature attention model, the training can be done via Reinforcement Learning (RL) techniques, where the reward signal is represented by the final class label prediction (or word of a caption).

According to an embodiment, when the soft attention modelling approach is used, wherein a plurality (all or a subset) of semantic layers is attended at each time step with different importance associated to each semantic layer, the model is differentiable. Herein, several or all feature layers will contribute with different weights, so that attention will focus more on some feature layers and less on others. Since the model is differentiable, the training of the feature attention model can be performed via Stochastic Gradient Descent (SGD) method, where the loss gradients are computed by standard backpropagation.

For both approaches, the training phase will learn the preferable policies for attending to different feature levels in order to come up with a good enough class prediction (or word of a caption). For example, for some image it may learn to use first the highest level concepts and, if the scene is not well understood, to move on to use one of the lower level feature layers.

As an alternative embodiment, the spatial attention model and the feature attention model may also be combined in order to train a single attention model which learns to attend a certain feature-level of a certain spatial location.

A skilled person appreciates that any of the embodiments described above may be implemented as a combination with one or more of the other embodiments, unless there is explicitly or implicitly stated that certain embodiments are only alternatives to each other.

The various embodiments may provide advantages over state of the art. The embodiments as described herein bring the automatic analysis of visual data to an upper semantic level. In fact, it performs analysis in a similar way as we humans do, i.e., by concentrating on different semantic levels of the characteristics of a certain visual input. Moreover, when combining the feature attention model with the spatial attention model, a twofold advantage may be obtained. On one hand the computational complexity is reduced because less data is analyzed. Also, in some cases the feature attention will require less spatial glimpses, thus further reducing the complexity. On the other hand, analysis is performed in a more semantically meaningful way, focusing on different feature levels at each time and building an internal understanding of the visual scene through the sequential feature attention process.

The various embodiments of the invention can be implemented with the help of computer program code that resides in a memory and causes the relevant apparatuses to carry out the invention. For example, an apparatus may comprise circuitry and electronics for handling, receiving and transmitting data, computer program code in a memory, and a processor that, when running the computer program code, causes the terminal device to carry out the features of an embodiment.

It is obvious that the present invention is not limited solely to the above-presented embodiments, but it can be modified within the scope of the appended claims.

The invention claimed is:

1. A method for operating a computer graphic system, the computer graphic system comprising a processor, a memory and an input/output (I/O) circuit, the method comprising:
   inputting a media content object via the I/O circuit into a feature extractor comprising a plurality of semantic layers forming a hierarchy of increasing semantic abstraction levels;
   extracting, by the feature extractor, a plurality of feature maps from said media content object on each of said plurality of semantic layers;
   selecting at least a portion of the media content object to be analysed;
   analysing said plurality of feature maps extracted on each of said plurality of semantic layers from at least the selected portion of the media content object;
   determining, by a feature attention modelling unit, based on the analysis of said plurality of feature maps extracted on each of said plurality of semantic layers from at least the portion of the media content object and an analysis of a previous state of a recognition unit, one or more feature maps selected from said plurality of feature maps of said plurality of semantic layers;
   determining a weight for each of said one or more feature maps;
   repeating the determining steps for different selected portions of the media content object, each time:
      processing, based on the analysis of said plurality of the feature maps and of the previous state of the recognition unit, each of said one or more feature maps by applying the corresponding weight,
      inputting said processed feature maps in an order corresponding to processing said feature maps to the recognition unit, and
      analysing a number of said processed features maps in said order in the recognition unit,
   until an object classification prediction about at least said portion of the media content object is output.

2. The method according to claim 1, further comprising selecting a next portion of the media content object to be analysed.

3. The method according to claim 1, wherein the order of processing the feature maps for said portion of the media content object is a predetermined order based on the analysis of the plurality of feature maps extracted from the portion of the media content object and of the previous state of the recognition unit.

4. The method according to claim 1, wherein the feature extractor is a convolutional neural network (CNN) and the recognition unit is implemented as a Recurrent Neural Network (RNN).

5. The method according to claim 1, wherein said one or more feature maps comprises a subset of feature maps selected from said plurality of feature maps of said plurality of semantic layers and a weight equal to 1 is determined for each of said one or more feature maps and a weight equal to 0 for all feature maps not belonging to said subset.

6. The method according to claim 1, wherein a training technique suitable for non-differentiable models is used for training the feature attention modelling unit.

7. The method according to claim 1, wherein said one or more feature maps comprises all feature maps from said plurality of feature maps of said plurality of semantic layers and a plurality of different weights are determined for each of the feature maps, wherein the sum of the weights is equal to 1.

8. The method according to claim 7, wherein the processing of each of the feature maps extracted on each of said plurality of semantic layers from at least the portion of the media content object further comprises
applying each of the determined plurality of different weights on the corresponding feature map; and
combining the weighted feature maps by concatenating or summing.

9. The method according to claim 8, wherein said next feature map processed based on the analysis of said plurality of the feature maps and of the previous state of the recognition unit is a next weighted combination of feature maps.

10. The method according to claim 7, wherein a training technique suitable for differentiable models is used for training the feature attention modelling unit.

11. An apparatus comprising at least one processor, an input/output (I/O) circuit and memory including computer program code, the memory and the computer program code configured to, with the at least one processor, cause the apparatus to at least:
input a media content object via the I/O circuit into a feature extractor comprising a plurality of semantic layers forming a hierarchy of increasing semantic abstraction levels;
extract, by the feature extractor, a plurality of feature maps from said media content object on each of said plurality of semantic layers;
select at least a portion of the media content object to be analysed;
analyse said plurality of feature maps extracted on each of said plurality of semantic layers from at least the selected portion of the media content object;
determine, by a feature attention modelling unit, based on the analysis of said plurality of feature maps extracted on each of said plurality of semantic layers from at least the portion of the media content object and an analysis of a previous state of a recognition unit, one or more feature maps selected from said plurality of feature maps of said plurality of semantic layers;
determine a weight for each of said one or more feature maps;
repeat the determining steps for different selected portions of the media content object, each time:
process, based on the analysis of said plurality of the feature maps and of the previous state of the recognition unit, each of said one or more feature maps by applying the corresponding weight,
input said processed feature maps in an order corresponding to processing said feature maps to the recognition unit, and
analyse a number of said processed features maps in said order in the recognition unit,
until an object classification prediction about at least said portion of the media content object is output.

12. The apparatus according to claim 11, further comprising computer program code configured to cause the apparatus to
select a next portion of the media content object to be analysed.

13. The apparatus according to claim 11, wherein the order of processing the feature maps for said portion of the media content object is a predetermined order based on the analysis of the plurality of feature maps extracted from the portion of the media content object and of the previous state of the recognition unit.

14. The apparatus according to claim 11, wherein the feature extractor is a convolutional neural network (CNN) and the recognition unit is implemented as a Recurrent Neural Network (RNN).

15. The apparatus according to claim 11, wherein said one or more feature maps comprises a subset of feature maps selected from said plurality of feature maps of said plurality of semantic layers and a weight equal to 1 is determined for each of said one or more feature maps and a weight equal to 0 for all feature maps not belonging to said subset.

16. The apparatus according to claim 11, wherein a training technique suitable for non-differentiable models is used for training the feature attention modelling unit.

17. The apparatus according to claim 11, wherein said one or more feature maps comprises all feature maps from said plurality of feature maps of said plurality of semantic layers and a plurality of different weights are determined for each of the feature maps, wherein the sum of the weights is equal to 1.

18. The apparatus according to claim 17, wherein the processing of each of the feature maps extracted on each of said plurality of semantic layers from at least the portion of the media content object further comprises computer program code configured to cause the apparatus to
apply each of the determined plurality of different weights on the corresponding feature map; and
combine the weighted feature maps by concatenating or summing.

19. The apparatus according to claim 18, wherein said next feature map processed based on the analysis of said plurality of the feature maps and of the previous state of the recognition unit is a next weighted combination of feature maps.

20. The apparatus according to claim 17, wherein a training technique suitable for differentiable models is used for training the feature attention modelling unit.

21. A computer program embodied on a non-transitory computer readable medium, the computer program comprising instructions causing, when executed on at least one processor, at least one apparatus to:
input a media content object via an input/output (I/O) circuit into a feature extractor comprising a plurality of semantic layers forming a hierarchy of increasing semantic abstraction levels;
extract, by the feature extractor, a plurality of feature maps from said media content object on each of said plurality of semantic layers;
select at least a portion of the media content object to be analysed;

analyse said plurality of feature maps extracted on each of said plurality of semantic layers from at least the selected portion of the media content object;

determine, by a feature attention modelling unit, based on the analysis of said plurality of feature maps extracted on each of said plurality of semantic layers from at least the portion of the media content object and an analysis of a previous state of a recognition unit, one or more feature maps selected from said plurality of feature maps of said plurality of semantic layers;

determine a weight for each of said one or more feature maps;

repeat the determining steps for different selected portions of the media content object, each time:
- process, based on the analysis of said plurality of the feature maps and of the previous state of the recognition unit, each of said one or more feature maps by applying the corresponding weight,
- input said processed feature maps in an order corresponding to processing said feature maps to the recognition unit, and
- analyse a number of said processed features maps in said order in the recognition unit, until an object classification prediction about at least said portion of the media content object is output.

* * * * *